(12) United States Patent
Taira et al.

(10) Patent No.: US 12,539,789 B2
(45) Date of Patent: Feb. 3, 2026

(54) COOLING CONTROL APPARATUS FOR ELECTRIC VEHICLE

(71) Applicant: SUBARU CORPORATION, Tokyo (JP)

(72) Inventors: Masakazu Taira, Tokyo (JP); Tomoya Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 165 days.

(21) Appl. No.: 18/244,027

(22) Filed: Sep. 8, 2023

(65) Prior Publication Data

US 2024/0100996 A1 Mar. 28, 2024

(30) Foreign Application Priority Data

Sep. 27, 2022 (JP) ................. 2022-153855

(51) Int. Cl.
*B60H 1/00* (2006.01)
*B60L 58/26* (2019.01)

(52) U.S. Cl.
CPC .......... *B60L 58/26* (2019.02); *B60H 1/00278* (2013.01); *B60L 2240/545* (2013.01); *B60L 2240/662* (2013.01)

(58) Field of Classification Search
CPC ............... B60L 58/26; B60L 2240/662; B60L 2240/545; B60L 53/14; B60L 58/27; B60H 1/00278; Y02T 10/7072; H01M 10/625; H01M 10/617
See application file for complete search history.

(56) References Cited

U.S. PATENT DOCUMENTS

| 2018/0198173 A1* | 7/2018 | Ichikawa ............ H01M 10/625 |
| 2021/0229523 A1 | 7/2021 | Terai et al. |

FOREIGN PATENT DOCUMENTS

| CN | 111845454 A | * 10/2020 | ............. B60L 58/12 |
| JP | H05178070 A | * 7/1993 | |
| JP | 2014-65376 A | 4/2014 | |
| JP | 2019170028 A | * 10/2019 | |
| JP | 2019-209764 A | 12/2019 | |

* cited by examiner

*Primary Examiner* — Frantz F Jules
*Assistant Examiner* — Martha Tadesse
(74) *Attorney, Agent, or Firm* — MCGINN IP LAW GROUP, PLLC

(57) ABSTRACT

A cooling control apparatus for an electric vehicle includes a processor. The processor is configured to control a cooler. The cooler is configured to cool a battery that is configured to supply electric power to a traveling motor of the electric vehicle. The processor is configured to limit an operation of the cooler when: an outside air temperature outside the electric vehicle is equal to or lower than a predetermined temperature; and the electric power of the battery is expected to be equal to or less than a predetermined amount.

5 Claims, 4 Drawing Sheets

COOLING CONTROL APPARATUS FOR ELECTRIC VEHICLE

CROSS-REFERENCE TO RELATED APPLICATIONS

The present application claims priority from Japanese Patent Application No. 2022-153855 filed on Sep. 27, 2022, the entire contents of which are hereby incorporated by reference.

BACKGROUND

The disclosure relates to a cooling control apparatus for an electric vehicle.

In general, an electric vehicle having no internal combustion engine that serves as a heat source, such as an EV (Electric Vehicle), consumes a large amount of electric power for heating. Accordingly, a large amount of power consumption due to the heating continues while involving difficulties in performing charging when the electric vehicle stalls due to, for example, heavy snowfall. This can exhaust a power supply early and lose a way of heating.

Japanese Unexamined Patent Application Publication Nos. 2019-209764 and 2014-65376 each disclose a technique in which a battery or a radiator communicates with a vehicle compartment, and a heat generated from the battery or discharged from the radiator is guided to the vehicle compartment to provide a way of heating.

SUMMARY

An aspect of the disclosure provides a cooling control apparatus for an electric vehicle. The cooling control apparatus includes a processor configured to control a cooler. The cooler is configured to cool a battery that is configured to supply electric power to a traveling motor of the electric vehicle. The processor is configured to limit an operation of the cooler when: an outside air temperature outside the electric vehicle is equal to or lower than a predetermined temperature; and the electric power of the battery is expected to be equal to or less than a predetermined amount.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
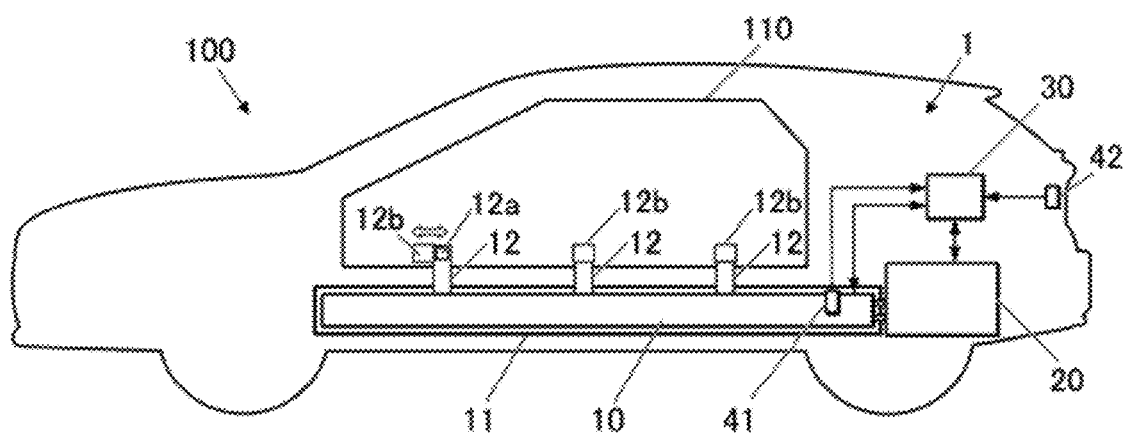
FIG. 1 is a block diagram illustrating a schematic configuration of an electric vehicle including a cooling control apparatus according to one example embodiment.

When a power supply of an electric vehicle is exhausted, a loss of a heat generated from a battery or a radiator occurs early. Accordingly, simply guiding the heat generated from the battery or the radiator to a vehicle compartment is not expectable as an effective way of heating.

It is desirable to provide a cooling control apparatus for an electric vehicle which makes it possible to suitably perform heating even when a power supply is exhausted.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 is a block diagram illustrating a schematic configuration of an electric vehicle 100 including a cooling control apparatus 1 according to an example embodiment.

The electric vehicle 100 may include a battery 10, a cooler 20, a vehicle processor 30, a battery temperature sensor 41, and an outside air temperature sensor 42. The battery 10 supplies electric power to an unillustrated traveling motor. The cooler 20 cools the battery 10. The vehicle processor 30 controls the cooler 20. The battery temperature sensor 41 may detect a temperature of the battery 10. The outside air temperature sensor 42 may detect an outside air temperature outside the electric vehicle 100.

The battery 10 may be a so-called battery pack having devices including, for example, battery modules and a battery control unit (CU). The battery 10 is not particularly limited. For example, the battery 10 may be disposed below a vehicle compartment 110 of the electric vehicle 100.

In some embodiments, a heat retaining member 11 may be disposed around the battery 10. For example, the heat retaining member 11 may be so provided as to cover a casing of the battery 10 over substantially the entire circumference, and inhibit a heat transfer between the battery 10 and the outside of the battery 10. In one example, the heat retaining member 11 may inhibit a heat dissipation from the battery 10.

In some embodiments, the inside of the battery 10 may communicate with the vehicle compartment 110 via communication ducts 12. In one embodiment, the communication duct may serve as a "communication passage". The communication ducts 12 each may have an opening 12a that opens into the vehicle compartment 110. The opening 12a may be manually openable and closable, for example, by a slidable cover 12b, and may be normally closed. In some embodiments, the communication ducts 12 each may have a heat retaining structure.

The cooler 20 may circulate a coolant (or a refrigerant) to an unillustrated cooling jacket by driving a cooling pump to cool the battery 10. The cooling jacket may be laid inside the battery 10. A specific configuration of the cooler 20 is not particularly limited. In some embodiments, the battery 10 may be air-cooled by a device such as a cooling fan or a blower.

In one embodiment, the vehicle processor 30 may serve as a "processor". The vehicle processor 30 controls the cooler 20 to cool the battery 10. The vehicle processor 30 may acquire data on a state quantity of the battery 10 from the battery 10, and control the battery 10. Non-limiting examples of the state quantity of the battery 10 may include a current, a voltage, and a remaining electric power amount. In some embodiments, the vehicle processor 30 may be a computer that executes a program of a later-described cooling control process stored in a built-in storage.

The battery temperature sensor 41 may detect the temperature of the battery 10 and output the detected temperature to the vehicle processor 30.

The outside air temperature sensor 42 may detect the outside air temperature of the electric vehicle 100 and output the detected outside air temperature to the vehicle processor 30.

The electric vehicle 100 further includes the cooling control apparatus 1. The cooling control apparatus 1 controls the cooler 20. The cooling control apparatus 1 includes at least the vehicle processor 30. In some embodiments, the cooling control apparatus 1 may further include one or more of the heat retaining member 11, the communication ducts 12, the battery temperature sensor 41, and the outside air temperature sensor 42.

[Cooling Control Process]

Next, a description is given of the cooling control process adapted to control the cooler 20 according to the example embodiment.

Figure 2:
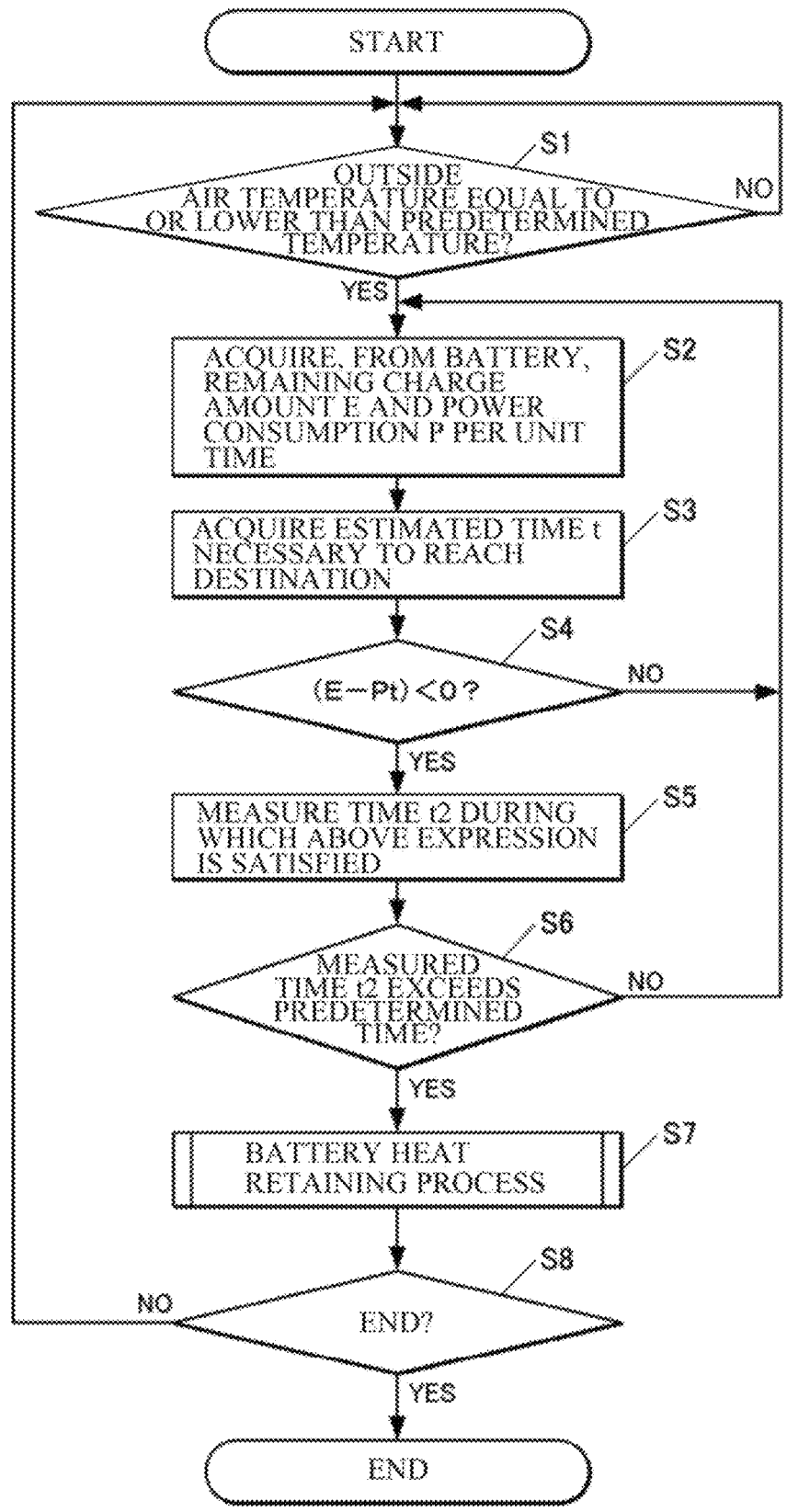
FIG. 2 is a flowchart illustrating an example of a flow of a cooling control process according to one example embodiment.
Figure 3:
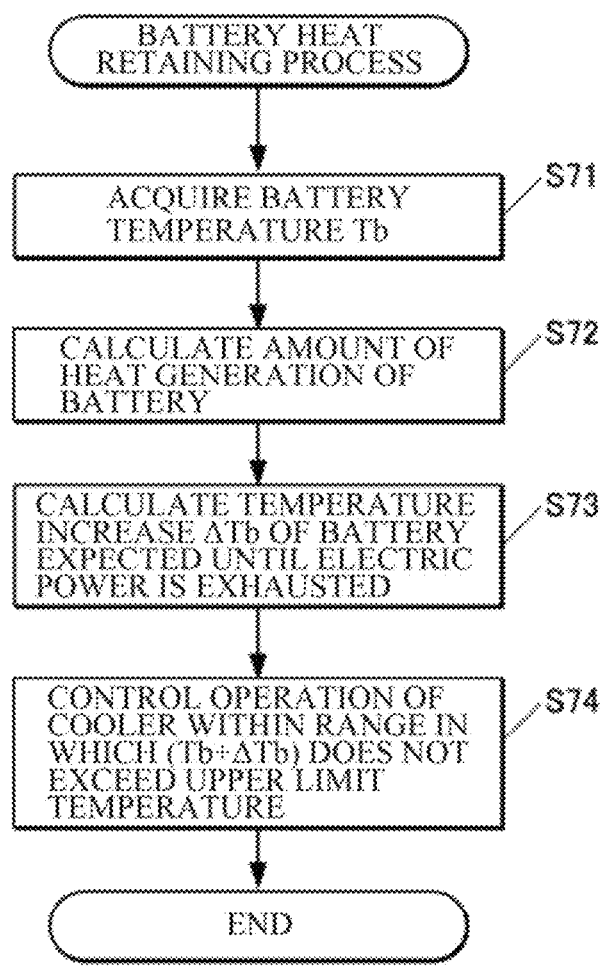
FIG. 3 is a flowchart illustrating a flow of the cooling control process.
Figure 4:
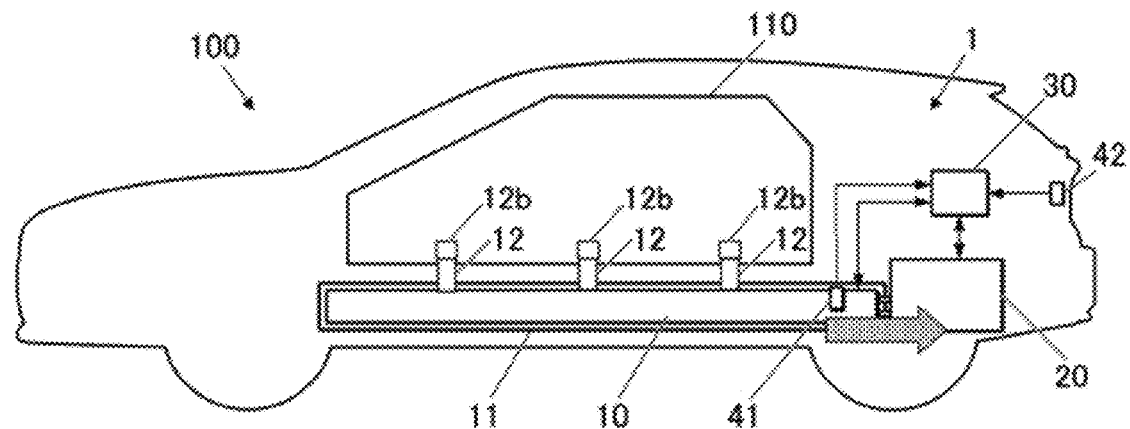
FIG. 4 is a diagram illustrating the cooling control process.
Figure 5:
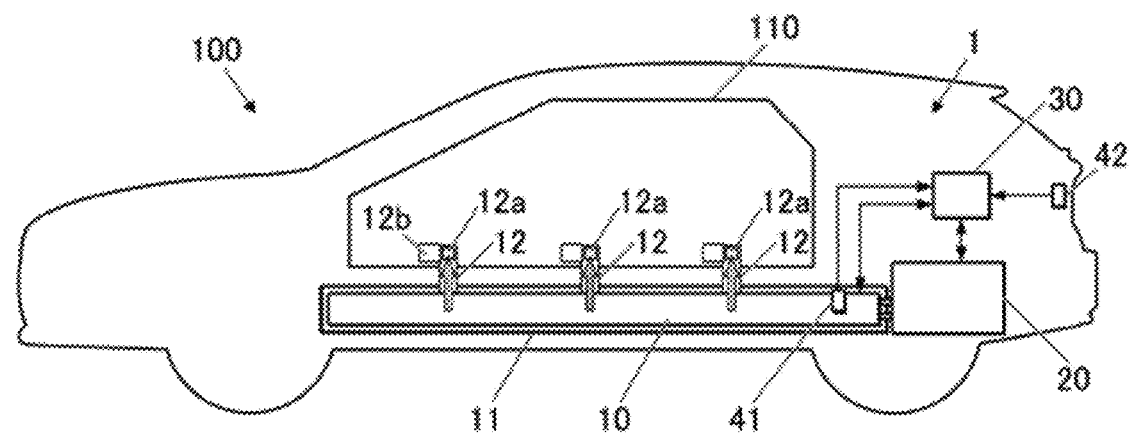
FIG. 5 is a diagram illustrating the cooling control process.

FIGS. 2 and 3 are flowcharts each illustrating a flow of the cooling control process, and FIGS. 4 and 5 are diagrams illustrating the cooling control process.

The cooling control process may be adapted to control the cooler 20. For example, the cooling control process may control the cooler 20 such that heating is suitably performable even when, for example, the electric power of the battery 10 is exhausted in winter in a cold district. The cooling control process may be executed by the vehicle processor 30 through reading out and expanding a corresponding program.

A description will be given hereinafter of an example, with reference to FIG. 4, in which the electric vehicle 100 travels in a cold district and the cooler 20 cools the battery 10 as usual.

Referring to FIG. 2, upon execution of the cooling control process, the vehicle processor 30 may determine whether the outside air temperature is equal to or lower than a predetermined temperature (step S1).

The vehicle processor 30 may acquire the outside air temperature from the outside air temperature sensor 42 and compare the acquired outside air temperature with a predetermined threshold (or a predetermined temperature). For example, the term "predetermined temperature" may refer to a low outside air temperature at which a life of an occupant is endangered when the heating of the electric vehicle 100 is lost.

If the vehicle processor 30 determines that the outside air temperature is not equal to or lower than the predetermined temperature (step S1: No), the vehicle processor 30 may repeat the process of step S1.

If the vehicle processor 30 determines in step S1 that the outside air temperature is equal to or lower than the predetermined temperature (step S1: Yes), the vehicle processor 30 may acquire, from the battery 10, a remaining charge amount of the battery 10 and a power consumption per unit time of the battery 10 (step S2).

Thereafter, the vehicle processor 30 may acquire an estimated time necessary to reach the destination (step S3).

The estimated necessary time is not particularly limited. For example, the estimated necessary time may be set or inputted by a user or the occupant. For example, the estimated necessary time may be acquired from an unillustrated car navigation system of the electric vehicle 100. The car navigation system may allow the user to set the destination and calculate, based on a detected vehicle speed, the estimated necessary time from a current location to the destination.

For example, the term "destination" may encompass, besides or in addition to the destination of traveling, a facility such as a nearest charging station where the battery 10 is chargeable or a facility where the occupant is able to warm up.

Thereafter, the vehicle processor 30 may determine whether the following Expression (1) is satisfied (step S4):

$$(E-Pt)<0 \tag{1}$$

where E is the remaining electric power amount of the battery 10, P is the power consumption per unit time of the battery 10, and t is the estimated necessary time necessary to reach the destination from the current location of the electric vehicle 100.

The Expression (1) may be a conditional expression adapted to determine whether the electric power of the battery 10 is exhausted in the middle of traveling to the destination.

In some embodiments, the determination in step S4 may be made on the condition that the electric power of the battery 10 is not "exhausted (approximately zero)" but "becomes equal to or less than a predetermined amount". In this case, a numerical value on the right side of the Expression (1) may be set to a desired "predetermined amount".

If the vehicle processor 30 determines in step S4 that the Expression (1) is not satisfied (step S4: No), the vehicle processor 30 may cause the process to proceed to step S2 described above. In some embodiments, the vehicle processor 30 may cause the process to proceed to step S1.

If the vehicle processor 30 determines in step S4 that the Expression (1) is satisfied (step S4: Yes), the vehicle processor 30 may measure a time t2 during which a state satisfying the Expression (1) continues (step S5).

Thereafter, the vehicle processor 30 may determine whether the time t2 measured in step S5 exceeds a predetermined time (step S6).

The vehicle processor 30 may determine whether the state satisfying the Expression (1) continues for the predetermined time, in order to level variations in power consumption of the traveling motor and various auxiliary machines such as headlights, an air conditioner, or a car stereo and to increase a probability that the electric power exhaustion occurs.

For example, the "predetermined time" may be set in consideration of: more accurately leveling the power consumption by setting the predetermined time to be longer; and accelerating the determination of the electric power exhaustion by setting the predetermined time to be shorter.

In some embodiments, although not particularly limited, the predetermined time may be set within an example range from 10 minutes to 30 minutes.

In some embodiments, in step S6, instead of (or in conjunction with) determining whether the state satisfying the Expression (1) continues for the predetermined time, the vehicle processor 30 may determine whether the Expression (1) is satisfied at a predetermined time rate or greater. In other words, in step S6, instead of (or in conjunction with) determining whether the state satisfying the Expression (1) continues for the predetermined time, the vehicle processor 30 may determine whether the Expression (1) is satisfied by taking into consideration a case in which the Expression (1) is satisfied intermittently at a high frequency.

If the vehicle processor 30 determines in step S6 that the time t2 does not exceed the predetermined time (step S6: No), the vehicle processor 30 may cause the process to proceed to step S2 described above. In some embodiments, the vehicle processor 30 may cause the process to proceed to step S1.

If the vehicle processor 30 determines in step S6 that that the time t2 exceeds the predetermined time (step S6: Yes), the vehicle processor 30 may perform a battery heat retaining process that limits an operation of the cooler 20 and raises the temperature of the battery 10 from a normal state or keeps the temperature of the battery 10 (step S7).

For example, the vehicle processor 30 may perform the battery heat retaining process to limit the operation of the cooler 20 when: the outside air temperature is equal to or lower than the predetermined temperature (step S1: Yes); and the electric power of the battery 10 is expected to be exhausted or to be equal to or less than the predetermined amount (step S2, S3, S4: Yes, S5, and S6: Yes).

Referring to FIG. 3, upon the battery heat retaining process, the vehicle processor 30 may acquire an actual battery temperature Tb from the battery temperature sensor 41 (step S71).

Thereafter, the vehicle processor 30 may acquire an amount of heat generation per unit time of the battery 10 (step S72). For example, the vehicle processor 30 may calculate the amount of heat generation of the battery 10 corresponding to the power consumption P per unit time (e.g., the amount of heat generation of the battery 10 when the power consumption P is consumed), based on the battery temperature Tb acquired in step S1 and any other state quantity of the battery 10.

Thereafter, the vehicle processor 30 may calculate a temperature increase $\Delta Tb$ of the battery 10 which is expected until the electric power of the battery 10 is exhausted (step S73).

For example, the vehicle processor 30 may calculate a time t3 until which the electric power is exhausted by dividing the remaining charge amount E by the power consumption P, and calculate the temperature increase $\Delta Tb$ as the product of the amount of heat generation of the battery 10 acquired in the step S72 and the time t3. However, a method of calculating the temperature increase $\Delta Tb$ is not limited thereto.

Thereafter, the vehicle processor 30 may operate the cooler 20 within a range in which a temperature (Tb+$\Delta Tb$) of the battery 10 that is based on the temperature increase does not exceed a predetermined upper limit temperature (step S74). For example, the term "upper limit temperature" may refer to a temperature at which any capability of the battery 10 may not possibly be exerted due to the temperature increase.

In step S74, as long as the temperature (Tb+$\Delta Tb$) of the battery 10 that is based on the temperature increase does not exceed the upper limit temperature, an operation control of the cooler 20 may be so relaxed as to tolerate the temperature increase of the battery 10.

This configuration may keep or increase the temperature inside the battery 10. Because the periphery of the battery 10 may be covered with the heat retaining member 11 and the openings 12a of the communication ducts 12 communicating with the vehicle compartment 110 are also closed, the heat that would otherwise be removed by the cooler 20 is accumulated inside the battery 10.

The foregoing example steps may complete the battery heat retaining process.

When the electric power of the battery 10 is exhausted with the battery heat retaining process being executed, not only the traveling power but also a way of heating such as the air conditioner is lost.

However, the battery heat retaining process helps to retain at least a part of the heat generated inside the battery 10. This configuration helps to introduce the heat inside the battery 10 into the vehicle compartment 110 for heating as illustrated in FIG. 5 by opening the openings 12a of the communication ducts 12 by the occupant.

Thereafter, as illustrated in FIG. 2, the vehicle processor 30 may determine whether to end the cooling control process (step S8). If the vehicle processor 30 determines that the cooling control process is not to be ended (step S8: No), the vehicle processor 30 may cause the process to proceed to step S1 described above. In some embodiments, if the vehicle processor 30 determines in any of step S1, S4, and S6 that the process is not to proceed to the battery heat retaining process in step S7 (step S1: No, S4: No, or S6: No), the vehicle processor 30 may release the limitation imposed on the operation the cooler 20 in step S74, and may cause the cooler 20 to return to an usual operation of the cooler 20.

If the vehicle processor 30 determines that the cooling control process is to be ended (step S8: Yes), for example, due to stopping of an operation of the electric vehicle 100, the vehicle processor 30 may end the cooling control process.

According to the foregoing example embodiment, the operation of the cooler 20 that cools the battery 10 is limited when: the outside air temperature outside the electric vehicle 100 is equal to or lower than the predetermined temperature; and the electric power of the battery 10 is expected to be exhausted or expected to be equal to or less than the predetermined amount.

This configuration helps to store in advance the heat generated by the battery 10 and to perform the heating by using the heat generated by the battery 10, when, for example, the electric power of the battery 10 is expected to be exhausted in winter. Accordingly, this configuration helps to suitably perform the heating even when the power supply is exhausted.

In some embodiments, the determination may be made that the electric power of the battery 10 is expected to be exhausted or to be equal to or less than the predetermined amount, when the state satisfying the Expression (1) is continued for longer than the predetermined time. The Expression (1) may be a condition under which the electric power is exhausted.

This configuration helps to make the determination with the power consumption, whose variations temporally occur, being leveled and to more accurately determine the electric power exhaustion of the battery 10.

In some embodiments, the operation of the cooler 20 may be limited within the range in which the temperature of the battery 10 does not exceed the predetermined upper limit temperature. The temperature of the battery 10 may be based on the temperature increase of the battery 10 expected to increase until the electric power of the battery 10 becomes exhausted or becomes equal to or less than the predetermined amount.

This configuration helps to relax the operation of the cooler 20 and accumulate the heat generated by the battery 10 while retaining the upper limit temperature of the battery 10 to ensure a stable operation.

In some embodiments, the battery 10 and the vehicle compartment 110 may communicate with each other via the heat-insulated communication duct 12.

This configuration helps to more suitably introduce the heat stored in the battery 10 into the vehicle compartment 110.

In some embodiments, the heat retaining member 11 may be disposed around the battery 10.

This configuration helps to suppress the heat dissipation of the battery 10 and to more suitably accumulate the heat generated by the battery 10 inside the battery.

Although some example embodiments of the disclosure have been described in the foregoing by way of example with reference to the accompanying drawings, the disclosure is by no means limited to the embodiments described above.

For example, in the foregoing example embodiment, the battery 10 and the vehicle compartment 110 may communicate with each other via the communication ducts (the communication passage) 12. In some embodiments, the battery 10 and the vehicle compartment 110 may communicate with each other via at least one communication duct 12. In some embodiments, the cover 12b that allows the openings 12a of the communication ducts 12 to be manually opened and closed may not be provided. In other words, in some embodiments, the openings 12a may remain open.

In the foregoing example embodiment, the vehicle processor 30 has been described as an example of the processor according to one embodiment of the disclosure. In some embodiments, the processor may be separate from the vehicle processor 30. In some embodiments, the processor may be any processor dedicated to the cooling control apparatus.

The cooling control apparatus for the electric vehicle according to any embodiment of the disclosure is widely applicable to a vehicle that includes a battery for traveling or driving.

It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The vehicle processor 30 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle processor 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle processor 30 illustrated in FIG. 1.

The invention claimed is:

1. A cooling control apparatus for an electric vehicle, the cooling control apparatus comprising:
a processor configured to control a cooler to cool a battery to a first temperature, the cooler being configured to provide a coolant to the battery around which a heat retaining member is disposed, the battery being configured to supply electric power to a traveling motor of the electric vehicle and to provide heat inside the battery into a compartment of the electric vehicle via communication ducts,
wherein the processor is configured to:
detect a second temperature of an outside air temperature at which a life of an occupant is endangered when a heating of the electric vehicle is lost when the outside air temperature is equal to or lower than a predetermined temperature,
predict power depletion of the battery using at least remaining electric power amount of the battery and power consumption per unit time of the battery, when detecting that an outside air temperature is equal to or lower than the second temperature, and
accumulate heat, generated by the battery, inside the battery to provide into the compartment via the communication ducts by limiting an operation of the cooler to cool the battery to a third temperature being equal to or more than the first temperature and lower an upper limit temperature at which the battery stops functioning, when predicting power depletion of the battery.

2. The cooling control apparatus for the electric vehicle according to claim 1, wherein the processor is configured to determine that the electric power of the battery is expected to be equal to or less than the predetermined amount, when a state satisfying the following Expression (1) is continued for longer than a predetermined time:

$$(E-Pt)<0 \qquad (1)$$

where E is a remaining electric power amount of the battery, P is a power consumption per unit time of the battery, and t is an estimated necessary time necessary to reach a destination from a current location of the electric vehicle.

3. The cooling control apparatus for the electric vehicle according to claim 1, wherein the processor is configured to limit the operation of the cooler within a range in which a temperature of the battery does not exceed the upper limit temperature, the temperature of the battery being based on a temperature increase of the battery expected to increase until the electric power of the battery becomes equal to or less than the predetermined amount.

4. The cooling control apparatus for the electric vehicle according to claim 1, wherein the battery and a vehicle compartment of the electric vehicle communicates with each other via the communication ducts which are heat-insulated.

5. The cooling control apparatus for the electric vehicle according to claim 1, further comprising a heat retaining member disposed around the battery.

* * * * *